(12) United States Patent
Clark et al.

(10) Patent No.: US 11,215,083 B2
(45) Date of Patent: Jan. 4, 2022

(54) RETENTION HARDWARE

(71) Applicant: United Technologies Corporation, Farmington, CT (US)

(72) Inventors: Thomas E Clark, Sanford, ME (US); Brian C McLaughlin, Kennebunk, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 24 days.

(21) Appl. No.: 16/734,965

(22) Filed: Jan. 6, 2020

(65) Prior Publication Data

US 2020/0149432 A1    May 14, 2020

Related U.S. Application Data

(62) Division of application No. 15/161,716, filed on May 23, 2016, now Pat. No. 10,563,542.

(51) Int. Cl.

| | |
|---|---|
| *F01D 25/28* | (2006.01) |
| *F23R 3/60* | (2006.01) |
| *F01D 25/24* | (2006.01) |
| *F01D 5/02* | (2006.01) |
| *F02C 3/04* | (2006.01) |
| *F02C 3/14* | (2006.01) |
| *F01D 9/02* | (2006.01) |

(52) U.S. Cl.
CPC ............... *F01D 25/28* (2013.01); *F01D 5/02* (2013.01); *F01D 25/243* (2013.01); *F02C 3/04* (2013.01); *F02C 3/14* (2013.01); *F23R 3/60* (2013.01); *F01D 9/023* (2013.01); *F05D 2220/32* (2013.01); *F05D 2260/30* (2013.01); *F05D 2260/31* (2013.01)

(58) Field of Classification Search
CPC ...... F02C 3/04; F02C 3/14; F23R 3/60; F01D 9/023; F01D 25/243; F01D 25/246; F01D 25/28; F01D 25/285; F05D 2220/32; F05D 2260/30; F05D 2260/31; F16B 5/025; F16B 5/0258; F16B 33/02; F16B 41/002

See application file for complete search history.

(56) References Cited

U.S. PATENT DOCUMENTS

| | | | |
|---|---|---|---|
| 3,269,702 | A | 8/1966 | Nichols et al. |
| 3,443,617 | A | 5/1969 | Whiteside et al. |
| 5,006,025 | A | 4/1991 | Duran |

(Continued)

FOREIGN PATENT DOCUMENTS

WO    2013165868    11/2013

OTHER PUBLICATIONS

EP Search Report dated Oct. 18, 2017 in EP Application No. 17172560.9.

(Continued)

*Primary Examiner* — Jason H Duger

(74) *Attorney, Agent, or Firm* — Snell & Wilmer L.L.P.

(57) ABSTRACT

A retention device includes a retention block including an opening extending through the retention block in a first direction. A tab also extends from the retention block in the first direction. A fastener extends through the opening and includes a head configured to engage the retention block. A clinch nut is coupled to the fastener with an interface surface of the clinch nut configured to engage the tab of the retention block.

13 Claims, 4 Drawing Sheets

(56) References Cited

U.S. PATENT DOCUMENTS

| | | | |
|---|---|---|---|
| 5,848,874 A * | 12/1998 | Heumann | F01D 9/042 |
| | | | 415/189 |
| 6,116,013 A | 9/2000 | Moller | |
| 8,021,091 B2 * | 9/2011 | Bentrim | F16B 37/068 |
| | | | 411/180 |
| 8,932,022 B2 | 1/2015 | Ivakitch et al. | |
| 9,140,125 B2 | 9/2015 | Ivakitch et al. | |
| 2007/0212192 A1 | 9/2007 | Shirk et al. | |
| 2013/0202440 A1 | 8/2013 | Ivakitch et al. | |
| 2013/0202450 A1 | 8/2013 | Ivakitch | |
| 2013/0291544 A1 * | 11/2013 | Eastwood | F23R 3/60 |
| | | | 60/734 |

OTHER PUBLICATIONS

European Patent Office, European Office Action dated Jun. 27, 2019 in Application No. 17172560.9.
USPTO, Requirement for Restriction dated Jan. 8, 2019 in U.S. Appl. No. 15/161,716.
USPTO, Pre Interview First Office Action dated Mar. 4, 2019 in U.S. Appl. No. 15/161,716.
USPTO, First Action Interview Office Action dated May 16, 2019 in U.S. Appl. No. 15/161,716.
USPTO, Final Office Action dated Sep. 19, 2019 in U.S. Appl. No. 15/161,716.
USPTO, Advisory Action dated Nov. 8, 2019 in U.S. Appl. No. 15/161,716.
USPTO, Notice of Allowance dated Dec. 12, 2019 in U.S. Appl. No. 15/161,716.

\* cited by examiner

RETENTION HARDWARE

CROSS-REFERENCE TO RELATED APPLICATIONS

This application is a divisional of, and claims priority to, and the benefit of U.S. Non-Provisional application Ser. No. 15/161,716, entitled "RETENTION HARDWARE," filed on May 23, 2016, which is hereby incorporated by reference in its entirety.

FIELD

The disclosure relates generally to gas turbine engines and, more particularly, to fasteners and retention hardware suitable for use in gas turbine engines.

BACKGROUND

Gas turbine engines have a generally cylindrical geometry housing various components and parts in a compact package. In areas such as vane supports, for example, the available room for hardware may be limited, particularly in a radial direction. Bolted joints in vane supports and other areas of the engine tend to limit the available design space and the ability to introduce additional hardware or design improvements, particularly with respect to legacy designs.

SUMMARY

A retention device is provided. The retention device comprises a retention block including an opening extending through the retention block in a first direction. A tab also extends in the first direction from the retention block. A fastener extends through the opening and includes a head configured to engage the retention block. A clinch nut is coupled to the fastener with an interface surface of the clinch nut configured to engage the tab of the retention block.

In various embodiments, a mating structure may have a flat surface configured to contact the tab of the retention block. The tab of the retention block may extend beyond the mating structure to contact the clinch nut. The interface surface of the clinch nut may contact an end portion of the tab. The retention block may include a retention tab oriented orthogonally to the tab of the retention block. The retention block may comprise a groove defined by a protrusion of the retention block. The protrusion may be orthogonal to the tab of the retention block. The retention block may be configured to transfer a load in the first direction of the tab into the mating structure.

A high-pressure turbine oriented about an axis is also provided. The high-pressure turbine may include a first stage support structure with a mating structure extending radially and defining a cavity. A retention block may define an opening aligned with the cavity and have a first tab extending axially from the retention block. The first tab may contact the mating structure. A fastener may extend through the opening and the cavity. A clinch nut may be coupled to the fastener and engage the first tab of the retention block.

In various embodiments, a retention tab may extend from the retention block in a radial direction. The retention tab may be configured to transfer an axial load into the first stage support structure. A groove may be formed in the retention block and configured to transfer an axial load into the first stage support structure. The clinch nut may include an interface surface of that contacts an end portion of the first tab. The interface surface of the clinch nut may protrude circumferentially from the fastener. The retention block may comprise a second tab oriented parallel to the first tab. The second tab may be configured to engage the mating structure.

A gas turbine engine is also disclosed. The gas turbine engine may include a compressor configured to rotate about an axis. A combustor may be aft of the compressor and in fluid communication with the compressor. A turbine may be aft of the combustor and in fluid communication with the combustor. The turbine my also include a first stage support structure having a mating structure extending radially. A retention block may be aligned with the mating structure with a first tab extending axially from the retention block contacting a flat surface of the mating structure. A fastener may extend through the retention block and the mating structure. A clinch nut may be coupled to the fastener and may engage the first tab of the retention block.

In various embodiments, a retention tab may extend from the retention block in a radial direction. The retention tab may be configured to retain a portion of the combustor axially. A groove may be formed in the retention block opposite the retention tab and configured to retain a heat shield in an axial direction. The clinch nut may include an interface surface of configured to contact an end portion of the first tab for anti-rotation. The interface surface of the clinch nut may protrude circumferentially from the fastener. The retention block may include a second tab oriented parallel to the first tab and configured to engage the mating structure.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure relates to retention hardware having a low-profile. The retention hardware incorporates anti-rotation features into a low-profile design suitable for use in vane supports having limited clearance. The low-profile nature of the retention hardware tends to minimize the volume occupied by retention hardware, thereby leaving unoccupied volume to introduce additional hardware or design improvements.

Figure 1:
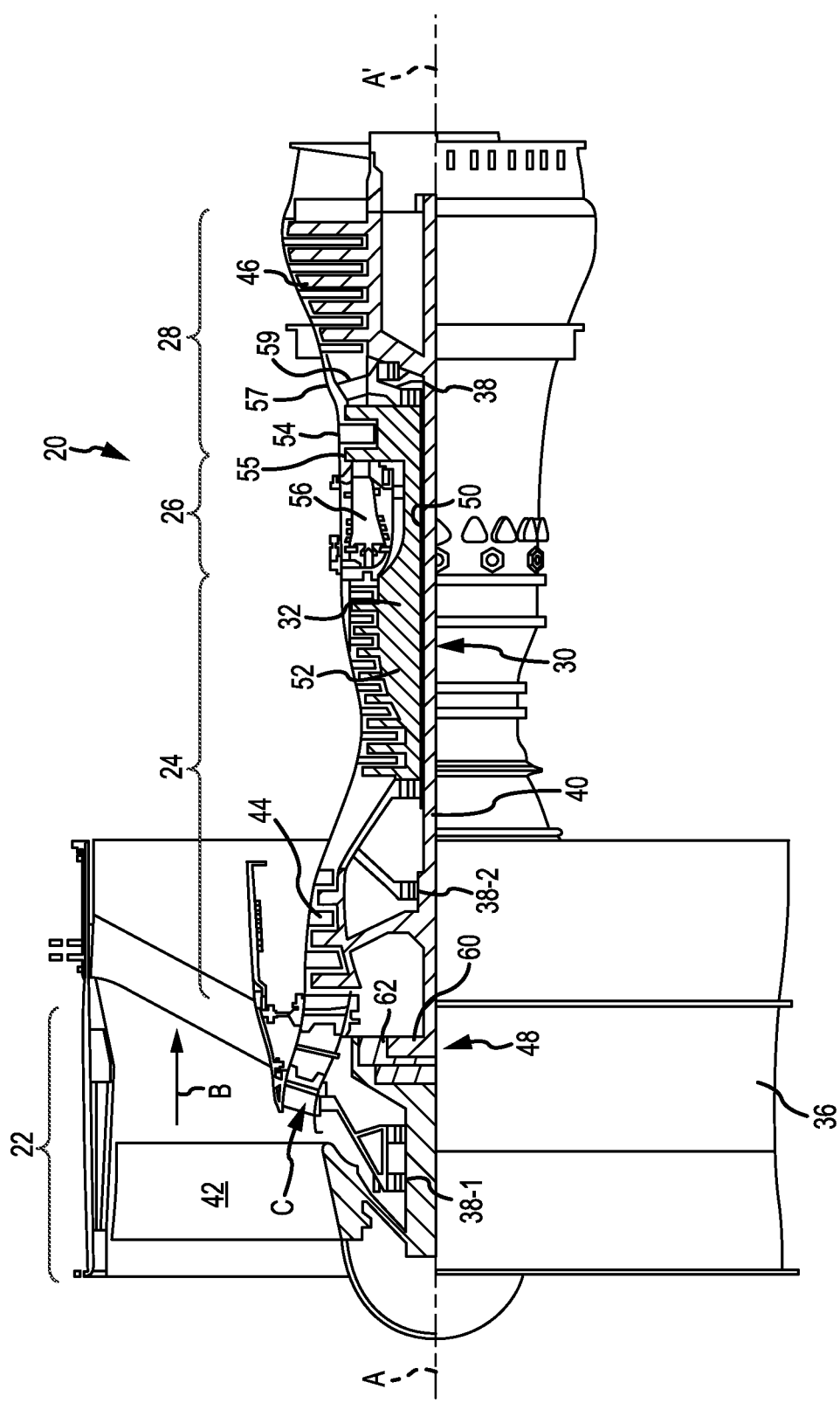
FIG. 1 illustrates an exemplary gas turbine engine, in accordance with various embodiments.

Referring now to FIG. 1, an exemplary gas turbine engine 20 is shown, in accordance with various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass-flow path B while compressor section 24 can drive coolant along a core-flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high-pressure compressor 52 and high-pressure turbine 54. Airfoils 55 coupled to a rotor of high-pressure turbine may rotate about the engine central longitudinal axis A-A' or airfoils 55 coupled to a stator may be rotationally fixed about engine central longitudinal axis A-A'.

A combustor 56 may be located between high-pressure compressor 52 and high-pressure turbine 54. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow along core-flow path C may be compressed by low-pressure compressor 44 then high-pressure compressor 52, mixed and burned with fuel in combustor 56, then expanded over high-pressure turbine 54 and low-pressure turbine 46. Mid-turbine frame 57 includes airfoils 59, which are in the core airflow path. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low-pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low-pressure compressor 44. Low-pressure turbine 46 pressure ratio may be measured prior to inlet of low-pressure turbine 46 as related to the pressure at the outlet of low-pressure turbine 46 prior to an exhaust nozzle. It should be understood, however, that the above parameters are exemplary of various embodiments of a suitable geared architecture engine and that the present disclosure contemplates other turbine engines including direct drive turbofans.

The various components in gas turbine engine 20 may be coupled together by fasteners. The fasteners at various locations may include retention hardware. For example, in the first stage of the high-pressure turbine the fastener may include combustor surge retention hardware.

Figure 2:
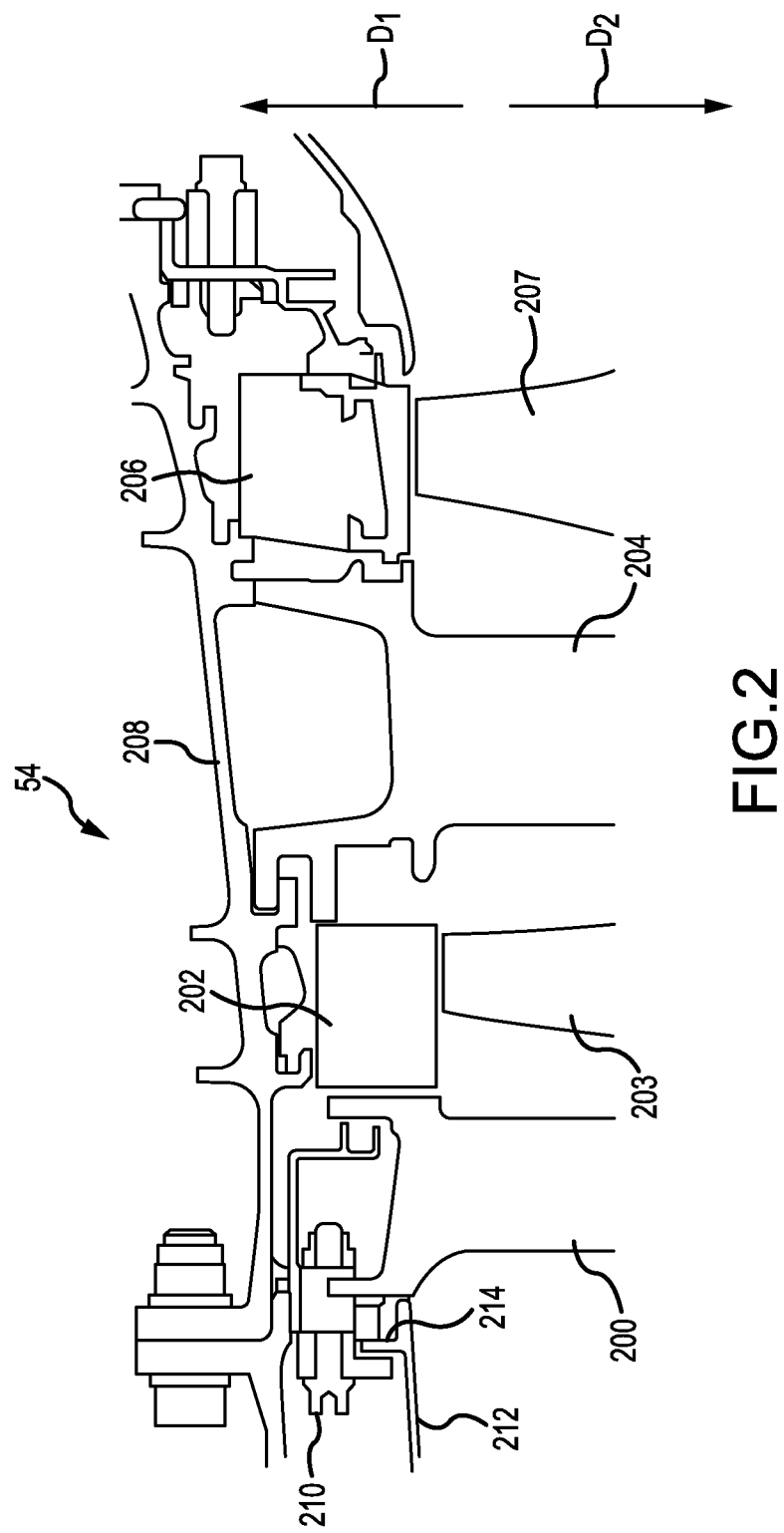
FIG. 2 illustrates an exemplary engine structure incorporating low-profile hardware, in accordance with various embodiments.

With reference to FIG. 2, an exemplary high-pressure turbine 54 is shown, in accordance with various embodiments. High pressure turbine 54 may include a first stage vane 200. A first stage blade outer air seal (BOAS) 202 may be disposed aft of first stage vane 200 and outboard (i.e., in direction $D_1$) from first stage blade 203. A second stage vane 204 may be disposed aft of first stage blade outer air seal 202. A second stage BOAS 206 may be disposed aft of second stage vane 204 with a second stage blade 207 disposed inboard (i.e., direction $D_2$) from second stage BOAS 206.

In various embodiments, high-pressure turbine 54 may be disposed aft of a combustor. Retention device 210 may be configured to retain an aft portion 212 of a combustor by interfacing with flange 214 extending outboard from aft portion 212 of the combustor. Retention device 210 may thus be configured to retain a combustor in response to a surge condition in which the pressure gradient in the combustor reverses.

Figure 3:
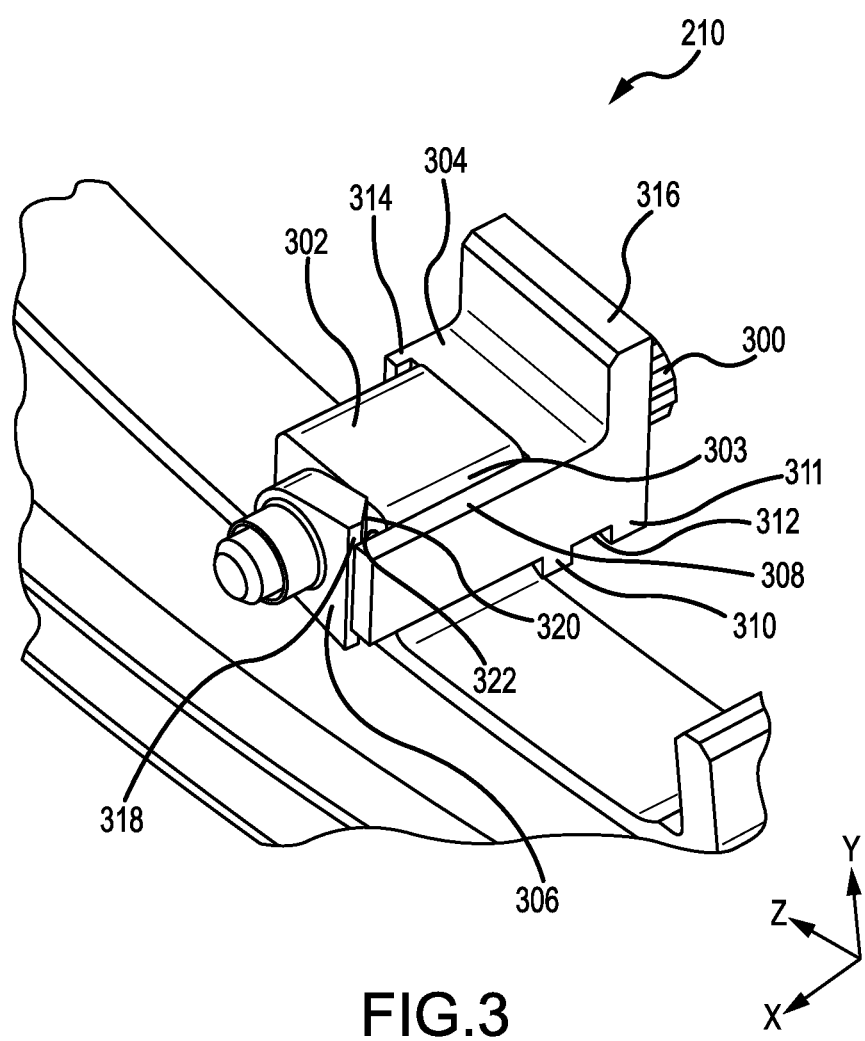
FIG. 3 illustrates a perspective view of low-profile retention hardware, in accordance with various embodiments.
Figure 4:
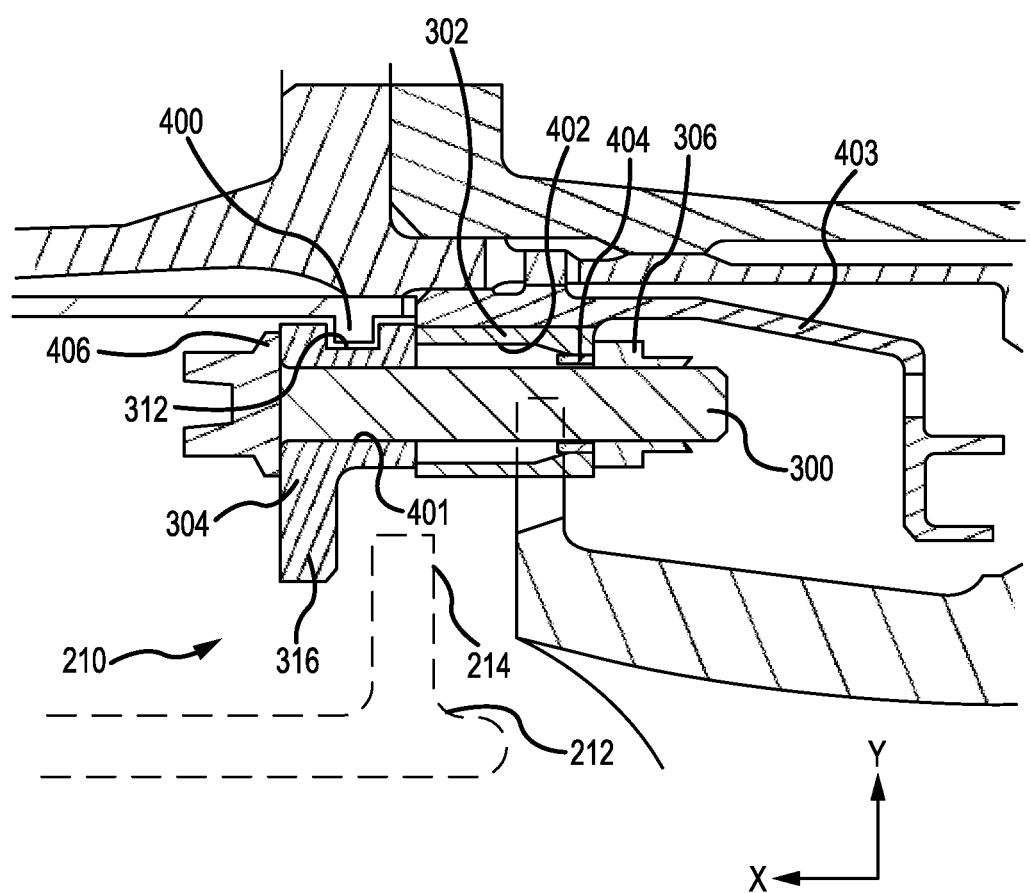
FIG. 4 illustrates a cross-sectional view of low-profile retention hardware, in accordance with various embodiments.

Referring now to FIGS. 3 and 4, retention device 210 is shown, in accordance with various embodiments. Retention device 210 may include a fastener 300 (e.g., a bolt) passing through a retention block 304, a mating structure 302 of the turbine case, and into a clinch nut 306. Mating structure 302 of the turbine case may have an interface surface 303 configured to contact the tab 308 of retention block 304. Contact tab may be a rectangular protrusion of retention block 304. Interface surface 303 may thus be a substantially flat surface configured to interface with a substantially flat surface of tab 308 of retention block 304. Tab 308 may extend in the axial direction (i.e., the x direction) when in high-pressure turbine 54 of FIG. 2.

In various embodiments, retention block 304 may include a first protrusion 310 and a second protrusion 311 that define groove 312 in retention block 304. Groove 312 may interface with a structure such as heat shield 400 to provide axial retention (i.e., in the x direction) in response to a surge event. A surge event may be, for example, a reversal of pressure in the axial direction within the turbine and/or combustor. First protrusion 310 and second protrusion 311 may be oriented in a plane (e.g., the y-z plane) orthogonal to the plane of tab 308 (e.g., the x-y plane). Tab 314 of retention block 304 may be shorter than tab 308 in the x direction. Tab 314 may also be defined in a plane parallel to the plane of tab 308 (e.g., with both tabs oriented in an x-y plane). In that regard, tab 314 and tab 308 may be configured to interface with mating structure 302 to anti-rotate retention block 304.

In various embodiments, retention block 304 may include a retention tab 316 configured to retain a combustor relative to retention block 304. As described in greater detail below, retention tab 316 may project radially (i.e., in the y direction) from retention block 304 and interface with a flange and/or tab of a combustor to axially (i.e., in the x direction) retain the combustor.

In various embodiments, end portion 322 of tab 308 may extend beyond an axial terminus of mating structure 302 in the x direction. End portion 322 of tab 308 may interface with clinch nut 306 to anti-rotate clinch nut 306. Clinch nut 306 may include interface surface 318 and overhang 320. Interface surface 318 and/or overhang 320 may contact end portion 322 of tab 308. Interference surface of clinch nut may protrude circumferentially (i.e., in the z direction) from fastener 300 rather than radially (i.e., in the y direction).

Referring now to FIG. 4, fastener 300 is disposed through opening 401 in retention block 304 and cavity 402 defined by mating structure 302 in the x direction. Clinch nut 306 includes tabs 404 that extend into cavity 402 of mating structure 302. Clinch nut 306 and head 406 of fastener 300 may be tightened against mating structure 302 and retention block 304, respectively. In that regard, retention block 304 may resist forward movement of aft portion 212 of the combustor in the axial direction (i.e., x direction) by interfacing with flange 214. Retention block 304 may also resist movement of heat shield 400 in the same manner. Forward force transferred into retention block 304 may be transferred into first stage support structure 403 of high-pressure turbine 54 (of FIG. 2) and into the turbine case 208 (of FIG. 2).

In various embodiments, the retention device of the present disclosure orients the clinch nut with to extend circumferentially and interface with a tab extending from the retention block for anti-rotation of the nut during assembly. The circumferential orientation of the clinch nut tends to minimize radial space occupied by the retention device. Thus, the retention device tends to minimize the volume occupied by retention hardware in the radial direction.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A high-pressure turbine oriented about an axis, comprising:
   a heat shield;
   a first stage support structure having a mating structure extending radially, the mating structure defining a cavity;
   a retention block defining an opening aligned with the cavity, the retention block comprising a first tab and a groove, the groove defined by a first radial protrusion and a second radial protrusion, the first tab extending axially from the retention block, the groove configured to provide axial retention of the heat shield relative to the retention block in response to a surge event;
   a fastener extending through the opening and the cavity; and
   a clinch nut coupled to the fastener and engaging the first tab of the retention block.

2. The high-pressure turbine of claim 1, further comprising a retention tab extending from the retention block in a radial direction.

3. The high-pressure turbine of claim 2, wherein the retention tab is configured to transfer an axial load into the first stage support structure.

4. The high-pressure turbine of claim 1, wherein the groove is configured to transfer an axial load into the first stage support structure.

5. The high-pressure turbine of claim 1, wherein the clinch nut comprises an interface surface of that contacts an end portion of the first tab.

6. The high-pressure turbine of claim 5, wherein the interface surface of the clinch nut protrudes circumferentially from the fastener.

7. The high-pressure turbine of claim 5, wherein the retention block comprises a second tab oriented parallel to the first tab and configured to engage the mating structure.

8. A gas turbine engine comprising:
a compressor configured to rotate about an axis;
a combustor aft of the compressor and in fluid communication with the compressor;
a turbine aft of the combustor and in fluid communication with the combustor, wherein the turbine comprises a first stage support structure having a mating structure extending radially;
a retention block aligned with the mating structure, the retention block comprising a first tab and a retention tab, the first tab extending axially from the retention block, the retention tab extending radially from the retention block, spaced apart axially from the combustor, and configured to contain the combustor relative to the retention block;
a fastener extending through the retention block and the mating structure; and
a clinch nut coupled to the fastener and engaging the first tab of the retention block.

9. The gas turbine engine of claim 8, the retention tab extending from the retention block in a radial direction, wherein the retention tab is configured to retain a portion of the combustor axially.

10. The gas turbine engine of claim 9, further comprising a groove formed in the retention block opposite the retention tab, wherein the groove is configured to retain a heat shield in an axial direction.

11. The gas turbine engine of claim 8, wherein the clinch nut comprises an interface surface configured to contact an end portion of the first tab for anti-rotation.

12. The gas turbine engine of claim 11, wherein the interface surface of the clinch nut protrudes circumferentially from the fastener.

13. The gas turbine engine of claim 12, wherein the retention block comprises a second tab oriented parallel to the first tab and configured to engage the mating structure.

* * * * *